United States Patent [19]

Hajjar

[11] Patent Number: 5,963,532
[45] Date of Patent: Oct. 5, 1999

[54] POLARIZATION ROTATION AND PHASE COMPENSATION IN NEAR-FIELD ELECTRO-OPTICAL SYSTEM

[75] Inventor: Roger Hajjar, Santa Clara, Calif.

[73] Assignee: Terastor Corporation, San Jose, Calif.

[21] Appl. No.: 09/010,415

[22] Filed: Jan. 21, 1998

[51] Int. Cl.[6] .................................................. G11B 7/00
[52] U.S. Cl. ........................... 369/112; 369/13; 369/126
[58] Field of Search ............................. 369/13, 110, 112, 369/126; 360/103, 114; 356/371, 376

[56] References Cited

U.S. PATENT DOCUMENTS

| | | | |
|---|---|---|---|
| 1,455,504 | 5/1923 | Odem . | |
| 3,609,721 | 9/1971 | Meneley | 340/174.1 E |
| 3,897,069 | 7/1975 | Lee | 274/47 |
| 4,101,948 | 7/1978 | Tadokoro et al. | 360/137 |
| 4,519,059 | 5/1985 | Denis | 369/74 |
| 4,622,618 | 11/1986 | Oishi et al. | 360/133 |
| 4,633,450 | 12/1986 | Gueugnon | 369/13 |
| 4,657,352 | 4/1987 | Suda et al. | 350/432 |
| 4,661,874 | 4/1987 | Buehl et al. | 360/128 |
| 4,753,521 | 6/1988 | Deserno | 359/663 |
| 4,794,586 | 12/1988 | Korth | 369/215 |
| 4,927,247 | 5/1990 | Tanaka et al. | 350/432 |
| 4,965,780 | 10/1990 | Lee et al. | 369/13 |
| 4,987,292 | 1/1991 | Howard | 250/201.5 |
| 5,020,040 | 5/1991 | Lee | 369/13 |
| 5,105,408 | 4/1992 | Lee et al. | 369/44.15 |
| 5,112,662 | 5/1992 | Ng | 428/64 |
| 5,115,363 | 5/1992 | Khan et al. | 360/104 |
| 5,120,603 | 6/1992 | Schmidt | 428/336 |
| 5,121,256 | 6/1992 | Corle | 359/356 |
| 5,125,750 | 6/1992 | Corle et al. | 359/44.15 |
| 5,128,216 | 7/1992 | Ng | 428/695 |
| 5,136,448 | 8/1992 | Kiriyama et al. | 360/128 |
| 5,153,870 | 10/1992 | Lee et al. | 369/111 |
| 5,157,555 | 10/1992 | Reno | 359/823 |
| 5,161,040 | 11/1992 | Yokoyama et al. | 359/19 |
| 5,161,134 | 11/1992 | Lee | 369/13 |
| 5,182,444 | 1/1993 | Howard | 250/201.5 |
| 5,191,563 | 3/1993 | Lee et al. | 369/13 |
| 5,197,050 | 3/1993 | Murakami et al. | 369/13 |
| 5,202,880 | 4/1993 | Lee et al. | 369/275.4 |
| 5,223,710 | 6/1993 | Paviak | 250/230 |
| 5,228,022 | 7/1993 | Compton et al. | 369/72 |
| 5,232,570 | 8/1993 | Haines et al. | 204/192.16 |

(List continued on next page.)

FOREIGN PATENT DOCUMENTS

| | | | |
|---|---|---|---|
| 62-31080 | 2/1987 | Japan | 23/3 |
| 62-204421 | 9/1987 | Japan | 5/41 |

OTHER PUBLICATIONS

Hayashi, S., et al. . "Solid Immersion Lens for Optical Storage," Standard University, G.L. Report No. 5258, Feb. 1995 (9 page document).

ichimura, Isao, et al. . "High Density Optical Recording Using a Solid Immersion Lens," Stanford University, G.L. Report No. 5371, Nov. 1995, pp. 1–22 and Figs. 1–17.

Mamin, H.J., et al., "High density optical recording with a flying solid imersion Lens," presented at the Optical Data Storage conference in San Diego, California in May, 1995, pp. 1–2.

(List continued on next page.)

*Primary Examiner*—John W. Cabeca
*Assistant Examiner*—Kim-Kwok Chu
*Attorney, Agent, or Firm*—Fish & Richardson P.C.

[57] ABSTRACT

An electro-optical storage system based on a near-field configuration having phase-distortion reducing mechanism. The system comprises a read/write head and a head positioning system, an optics module including beam relay optics and signal detectors, an optical medium and a corresponding medium driving unit, and an electronic control system. The optical head includes a near-field lens positioned over the optical medium by a fraction of the wavelength. The phase-distortion reducing mechanism imposes a phase-compensating profile on the optical wavefront and/or rotates the beam polarization to reduce a phase distortion caused by the lens aberrations and an extra phase profile induced by the near-field configuration.

36 Claims, 11 Drawing Sheets

U.S. PATENT DOCUMENTS

| | | | |
|---|---|---|---|
| 5,243,241 | 9/1993 | Wang | 310/36 |
| 5,247,510 | 9/1993 | Lee et al. | 369/118 |
| 5,255,260 | 10/1993 | Yamada et al. | 369/39 |
| 5,260,928 | 11/1993 | Lee et al. | 369/112 |
| 5,288,997 | 2/1994 | Betzig et al. | 359/356 |
| 5,295,122 | 3/1994 | Murakami et al. | 369/13 |
| 5,307,336 | 4/1994 | Lee et al. | 369/112 |
| 5,381,402 | 1/1995 | Lee et al. | 369/291 |
| 5,432,763 | 7/1995 | Campbell, et al. | 369/112 |
| 5,445,011 | 8/1995 | Ghislain et al. | 250/306 |
| 5,449,590 | 9/1995 | Imaino et al. | 430/273 |
| 5,450,379 | 9/1995 | Fujimori et al. | 369/275.1 |
| 5,452,283 | 9/1995 | Lee et al. | 369/112 |
| 5,467,238 | 11/1995 | Lee et al. | 360/128 |
| 5,470,627 | 11/1995 | Lee et al. | 428/64.4 |
| 5,486,970 | 1/1996 | Lee et al. | 360/128 |
| 5,497,359 | 3/1996 | Mamin et al. | 369/44.15 |
| 5,541,888 | 7/1996 | Russell | 349/112 |
| 5,600,494 | 2/1997 | Kubo et al. | 359/719 |
| 5,602,819 | 2/1997 | Inagaki et al. | 369/112 |
| 5,602,820 | 2/1997 | Wickramasinghe et al. | 369/126 |
| 5,631,893 | 5/1997 | Kang et al. | 369/44.15 |
| 5,689,480 | 11/1997 | Kino | 369/13 |
| 5,699,341 | 12/1997 | Sugi et al. | 369/112 |
| 5,724,139 | 3/1998 | Guerra | 356/371 |
| 5,729,393 | 3/1998 | Lee et al. | 369/44.15 |
| 5,831,797 | 11/1998 | Schaenzer et al. | 369/13 |

OTHER PUBLICATIONS

Terris, B.D., et al., .. "Near–Field optical data storage using a solid immersion Lens," *Aplied Physics Letters*, 65 (4), Jul. 25, 1994, pp. 388–390.

Rubin, Kurt A., et al., "Volumetric Magneto–Optic Storage on Multiple Recording Surfaces", Jul. 8–12, 1996, *Technical Digest*, 1996, vol. 12.

Maeda, Fumisada, et al., "High Density Optical Disk System Using a New Two–Element Lens and a Thin Substrate Disk", research Center, Sony Corporation, pp. 342–344.

Rubin, Kurt A., et al., "Multilevel Volumetric Optical Storage", SPIE vol. 2338 *Optical Data Storage* 1994, pp. 247–253.

Yamamoto et al., A 0.8 Numerical Aperture Two element Objective Lens for the Optical Disk, OfA2–1:345–347.

Kino et al., High Density Storage with a Solid Immersion Lens, Invited Paper Stanford University.

Mansfield et al., Solid Imersiom Microscope, Appl. Phys. Lett. 57(24):2615 (Dec. 10, 1990).

Mansfield et al., High–Numerical–aperture Lens system for optical storage, Optic Letters vol. 18(4):365–367 (Aug. 28, 1992).

Betzig et al., Near–field magneto–optics and High Density Data Storage, Appl. Phys. Lett. 61(2):142–144.

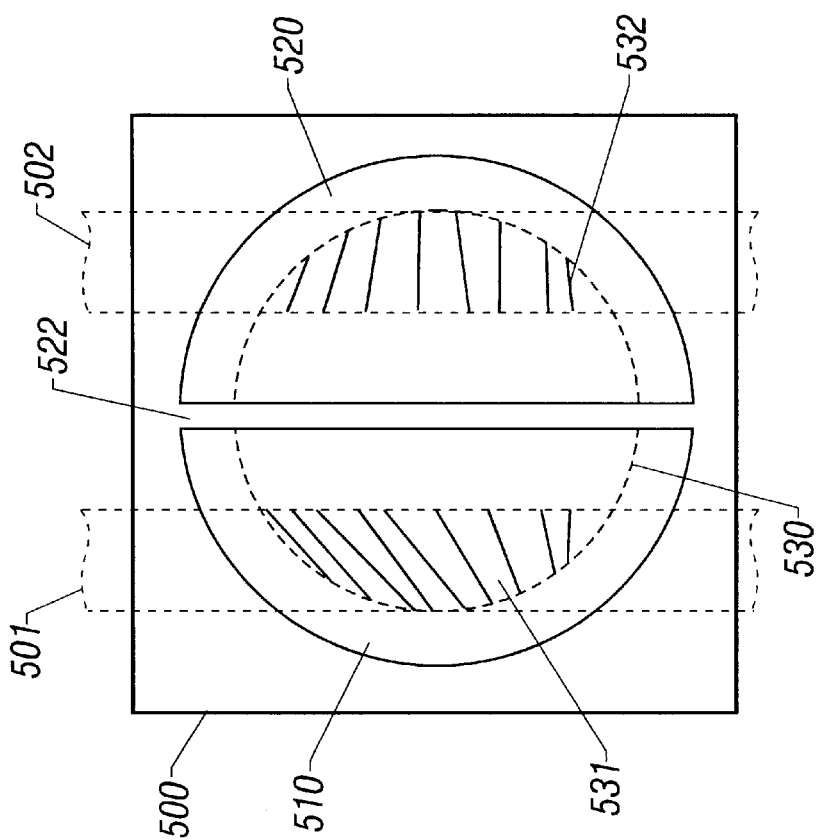
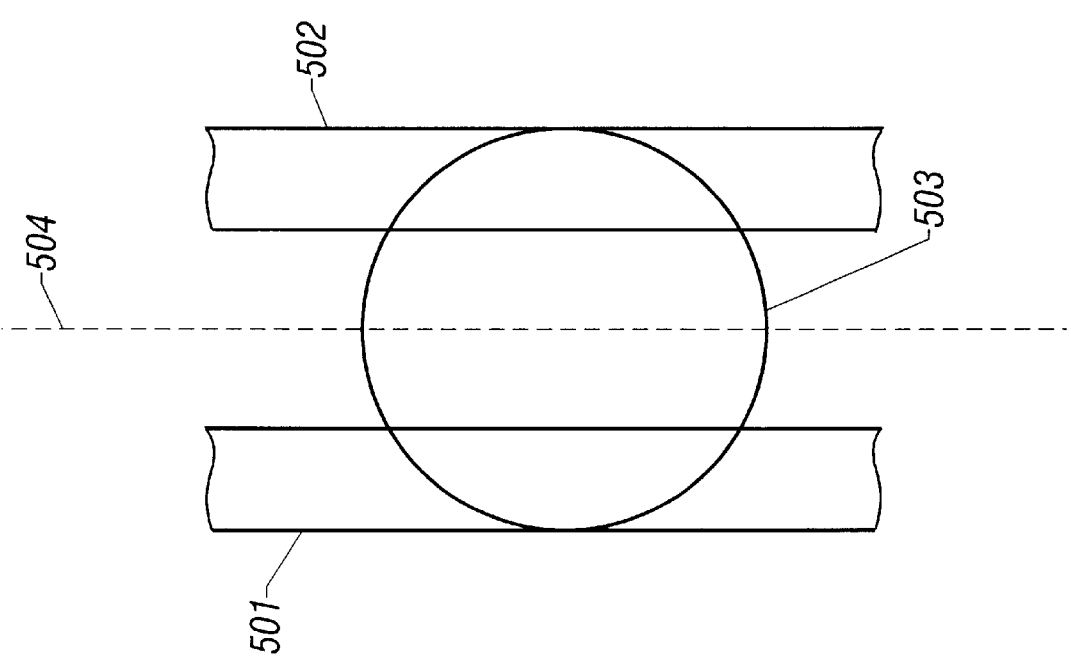

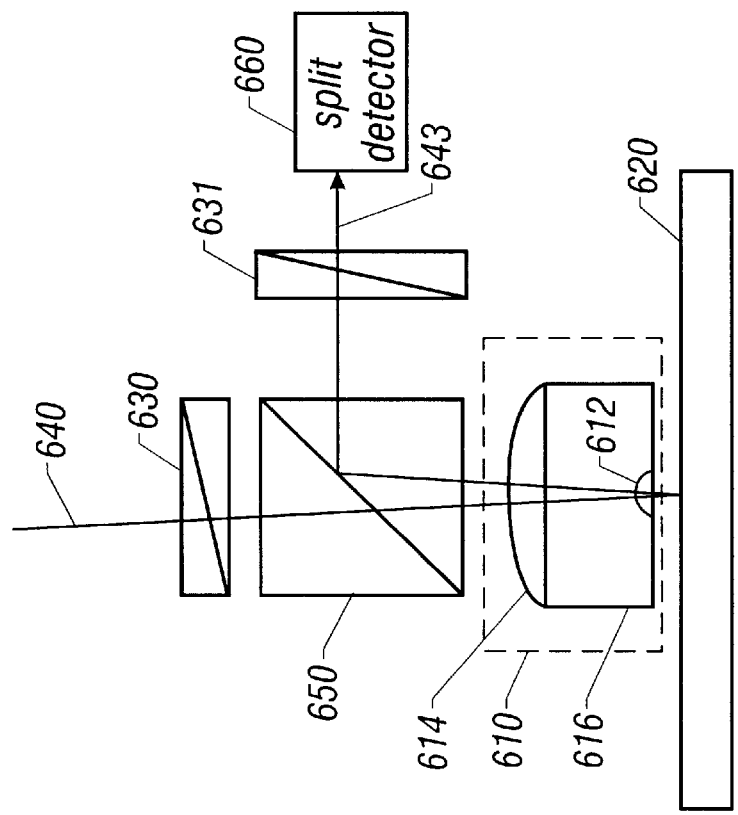
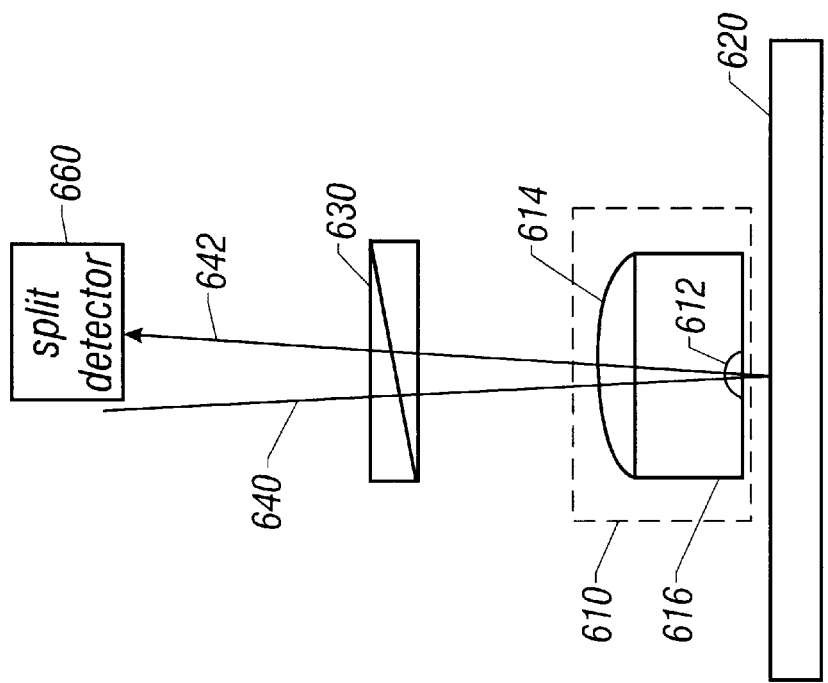
FIG. 6B
FIG. 6A

POLARIZATION ROTATION AND PHASE COMPENSATION IN NEAR-FIELD ELECTRO-OPTICAL SYSTEM

This application claims the benefit of the U.S. Provisional Application No. 60/055,942, filed on Aug. 18, 1997, which is incorporated herein by reference.

FIELD OF THE INVENTION

The present invention generally relates to optical storage and data retrieval, and more particularly, to techniques and electro-optical systems for data storage and retrieval in a near-field recording configuration.

BACKGROUND OF THE INVENTION

Optical storage can be used to achieve high areal density data storage. The areal density of an optical storage device, in principle, may be only limited by the diffraction limit of an illuminating optical beam for reading or writing. Electro-optical data storage systems based on magneto-optical materials can be configured to produce an areal data density of up to or higher than about one gigabit per square inch.

One approach to increase the areal data density in an optical storage system uses a reduced beam size. Due to the diffraction limit, a monochromatic optical beam can be focused to a significantly reduced or minimized beam size on the order of a wavelength. Light sources with short wavelengths, such as those toward the blue end of the optical spectrum, may be used to further decrease the beam size and thereby achieve higher aerial density.

Alternatively, the numerical aperture of the objective lens can be increased to focus a beam of a given wavelength to a smaller spot within the diffraction limit.

SUMMARY OF THE INVENTION

The present disclosure describes an electro-optical storage system which include a read/write head and a head positioning system, an optics module with beam relay optics and signal detectors, an optical medium, and an electronic control system. The read/write head is spaced from an active recording layer in the medium by a fraction of the wavelength to form a near-field configuration. The areal data density, therefore, can be increased by focusing a read/write beam to a dimension smaller than the minimum beam size under the diffraction limit.

The read/write head may include an objective lens and a near-field lens and is preferably a "flying" head which is suspended over the optical medium by a thin air-bearing surface. An optical read/write beam exiting the near-field lens is then coupled to the optical medium by evanescent waves. The near-field lens may have a high index of refraction and a high numerical aperture which may be up to or greater than unity.

The optical medium may be preferably structured to form a first surface recording configuration in which one or more active recording layers are formed on or near the top surface of the medium and spaced from the bottom of the flying head by a distance less than a wavelength.

One aspect of the invention is the automatic optimization and maintenance of focus under the preferred near-field condition. An air-bearing surface may be used to suspend the flying head over the surface of the optical medium by a fraction of a wavelength.

The optics module may be a fixed optics module, i.e., the relative positions of different optical elements within the module are fixed at predetermined distances. In one embodiment, the fixed optics module includes a light source, a data/servo detector, and beam control optics which may include a relay lens and an imaging lens to guide a read/write beam to and from the flying head. The beam control optics may further include an optical steering element (e.g., a galvo mirror) to provide a fine positioning means for guiding the read/write beam.

An actuator in either rotary or linear configuration may be used as a coarse positioning means for the optical disk drive although other positioning devices may also be used. The fixed optics module and the flying head are attached to an actuator arm. Hence, any user data sector on the optical medium may be addressed with a read/write beam by adjusting the actuator. The beam control optics in the fixed optics module may include a galvo mirror or a galvo-controlled prism (or transparent plate) to provide a fine positioning means for guiding the read/write beam.

Another aspect of the invention includes techniques for alleviating certain adverse phase distortion effects. One such phase distortion is dependent on the relative orientation of the beam polarization with respect to the tracking grooves on the medium, which is mainly caused by lens aberrations in the objective lens and the near-field lens and an extra phase pattern induced by the near-field interaction with the optical medium. Another such phase distortion is caused by polarization change of a polarized beam by the focusing of the objective lens and the near-field lens. A linearly polarized beam incident to the flying head thus may have both p-polarized and s-polarized components at the medium which experience different phase delays. Such different phase delays on the different components of the same optical wave can also effect phase distortion.

One embodiment of this aspect of the invention uses a polarization rotator to separate the phase distortion signal from the tracking error signal in a detection scheme using a split detector.

Another embodiment of this aspect of the invention implements one or more phase compensating elements with suitable phase profiles in the optical train to cancel the phase distortion. Such a phase compensating element may be combined with a lens to form a single optical element to perform both phase compensation and beam shaping.

A phase compensating element may be configured to include an angular phase compensation profile with respect to the optic axis of the optical train to compensate for the phase difference caused by the focusing-induced polarization change.

These and other aspects and advantages of the present invention will become more apparent in light of the following detailed description, the accompanying drawings, and the claims.

BRIEF DESCRIPTION OF THE DRAWINGS

FIG. 5A is a diagram illustrating a relative position of a read/write beam on an optical medium with tracks.

FIG. 5B is a diagram illustrating operation of a split detector in generating a tracking error signal.

FIG. 6A is a schematic showing a first test setup for observing phase distortion of a near-field flying head system.

FIG. 6B is a schematic showing a second test setup for observing polarization property of the phase distortion of a near-field flying head system.

DETAILED DESCRIPTION OF THE INVENTION

Figure 1:
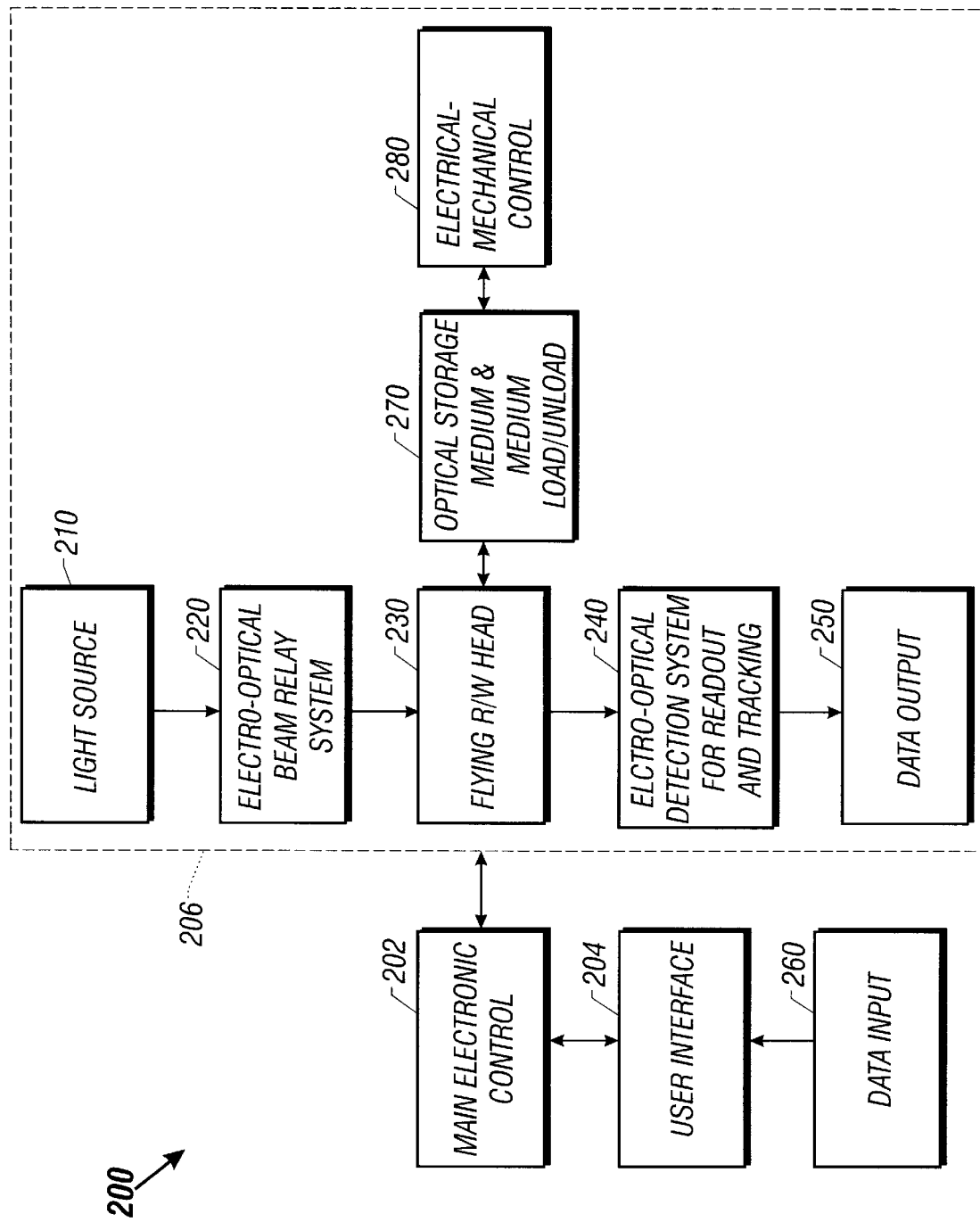
FIG. 1 is a block diagram showing a preferred optical rewritable storage system of the invention.

One embodiment of a near-field storage system in accordance with the present invention is shown in a block diagram of FIG. 1. The lines indicate a communication signal by optical and/or electrical carriers or both.

The invention implements a polarization rotation and/or a phase compensation mechanism to reduce the phase distortion caused by factors such as lens aberrations and the near-field configuration.

An optical storage medium 270 in the form of a disk or other format can be of a read-only type, or write-once-read-many type, or a write-many-read-many type. Data is spatially distributed and stored in the medium 270 through a predetermined encoding method. The medium 270 can be removable with a cartridge-type of protection housing and a respective load/unload system. Alternatively, the medium 270 can also be configured as a fixed medium such as a hard disk drive. A source of electromagnetic radiation, e.g., a light source 210 produces a light beam at a wavelength to which the optical medium 270 is responsive. A beam relay system 220 shapes the beam in a desired spatial profile and delivers the beam with desired propagation characteristics to a flying read/write head 230. The flying head 230 further shapes and focuses the beam generated by the light source 210 onto the optical medium 270 to read and/or write data thereon.

Preferably, the flying head 230 and the optical medium 270 are positioned relative to each other so that the optical spacing therebetween is less than one wavelength of the light produced by light source 210. This is known as a "near-field" configuration. In particular, the optical spacing can be less than one half of the wavelength (e.g., about one sixth of a wavelength). An air-bearing surface is formed at the base of the flying head 230 above the top surface of the medium to maintain a desired focus without conventional servo optics for focusing.

For a given wavelength, the focused beam size can be reduced by increasing the numerical aperture ("NA") of a focusing optical element (e.g., an objective lens assembly). In the present invention, one approach achieves a large numerical aperture in the flying head by combining a near-field lens with an objective lens. The near-field lens is preferably made of a high-index optical material to have a large effective NA. For example, a solid immersion lens ("SIL"), a graded index lens ("GRIN lens") or a "Gradium lens" may be used as the near field lens to achieve an NA up to and greater than unity.

In the above near-field configuration, light is coupled by evanescent wave coupling rather than by light propagation between the exit surface of the flying head and the optical medium via a thin layer of air gap. This near-field interaction can cause unique behaviors of a reflected optical wave from the optical medium and thus affect the signal detection and data retrieval.

Alternatively, a non-near-field configuration can also be used with the flying head 230, in which case the coupling between the flying head and the recording layer is by light propagation and a conventional servo focusing system is needed to directly focus the beam onto the recording surface.

The relative position and motion of the flying head 230 and the optical medium 270 are determined and controlled by both the position and movement of the flying head 230 and optical medium 270. In particular, an electrical-mechanical control 280 is used to control the position and motion of the optical medium 270. For example, a motorized spindle system can be included in the electrical-mechanical control 280 if the optical medium 270 is in a disk format.

The light beam incident on the optical medium 270 is reflected. In a recording operation, the reflected beam from the optical medium 270 is encoded with beam-tracking information. In a readout operation, the reflected beam usually is modulated with both tracking information and the data stored on the optical medium 270. The reflected beam from the optical medium 270 is received by the flying head 230 and routed to a detection system 240 that includes photodetectors for both data extraction and beam tracking.

Recording data onto the optical medium 270 can be done by either modulating a writing beam via an optical modulation of beam intensity, phase, or polarization (either at the light source 210 or at the beam relay system 220), or directly modulating the state of the optical medium 270 through thermal or electromagnetic methods.

A main electronic control 202 is preferably implemented to monitor and control all components and subsystems. A user interface 204 includes, but is not limited to, a computer keyboard, a display, electrical and mechanical switches and control buttons.

These system components and operations thereof are described in U.S. patent application Ser. No. 08/846,916, "Electro-optical storage system with flying head for near-field recording and reading", filed on Apr. 29, 1997, the entire disclosure of which is incorporated herein by reference as part of the present specification.

Figure 2:
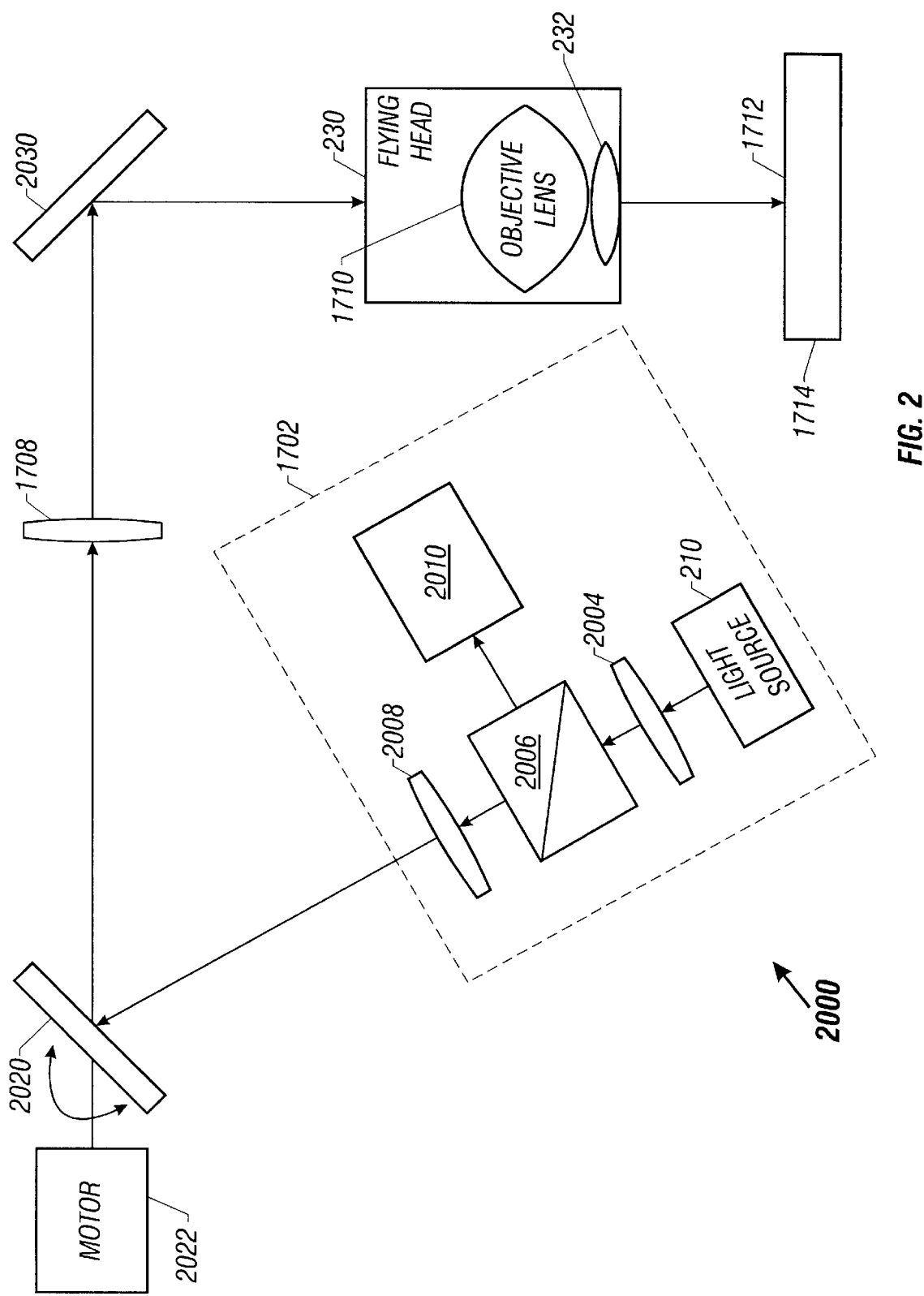
FIG. 2 is a schematic illustration showing an embodiment of the optical train using a galvo reflector for precisely positioning the read/write beam on an optical medium.

In a practical implementation of the system of FIG. 1, a positioning mechanism is needed to guide the read/write beam to a desired location on the optical medium. FIG. 2 shows one exemplary optical train 2000 linking a fixed optical module 1702 ("FOM") to an optical medium 1714.

A light source (e.g., a laser) 210 emits a light beam that is corrected and collimated by a first optical element 2004 and a second optical element 2008. Reflectors 2020 and 2030 and an imaging lens 1708 direct the collimated beam to an objective lens 1710. The beam is then focused onto a surface 1712 of the optical medium 1714. The reflected beam from the optical medium 1714 is then received by the objective lens 1710 and sent back to the optical module

1702. A beamsplitter 2006 guides the reflected beam, at least in part, to a detection module 2010 having detectors for both data extraction and beam tracking.

A near-field recording/reading configuration with a flying head is preferably used to achieve automatic focusing. The beam tracking is done by a servo system using tracking error signals produced by the tracking flags or grooves in the optical medium 1714. A galvanometer motor 2022 can be used to control either reflectors 2020 or 2030 for beam tracking. FIG. 2 shows the galvanometer 2022 connected to the first reflector 2020 for beam tracking. Alternatively, the reflector 2030 can be adjusted for beam tracking.

Coarse beam guiding and tracking may be accomplished by implementing an actuator. Several types of actuators can be used in accordance with the present invention to position the flying head over the optical medium at a selected location, two of which are described here: a rotary actuator and a linear actuator.

Figure 3:
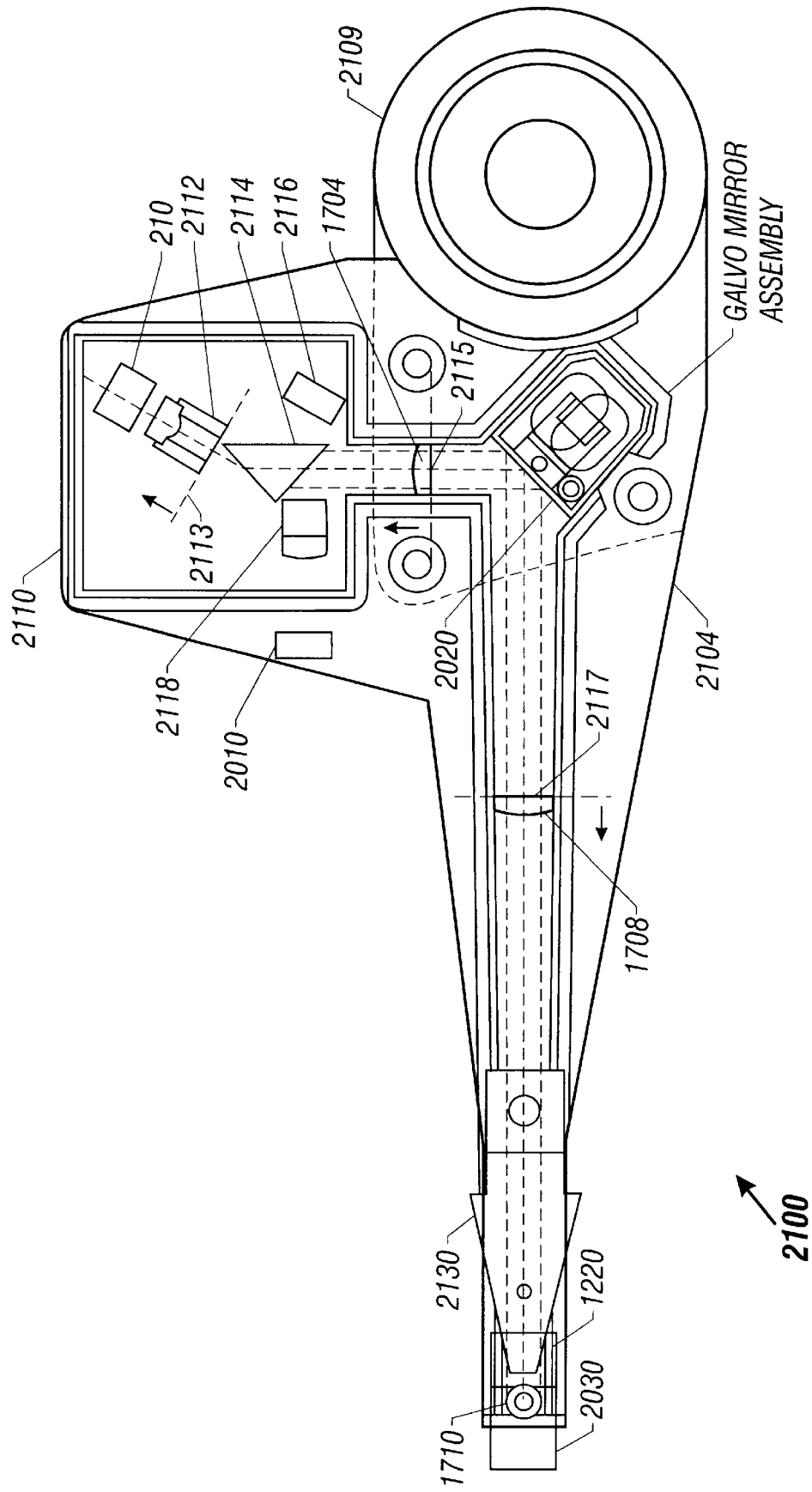
FIG. 3 is a schematic illustration showing a rotary actuator holding a fixed optics module and a flying head with a galvo mirror for fine positioning.

FIG. 3 shows a rotary actuator system 2100 with a fixed optics module based on the optical train of FIG. 2. A rotary actuator includes a hub 2109 and a rotary actuator arm 2104 substantially parallel to the surface 1712 and pivotally mounted to a drive base plate (not shown). The rotary actuator has a coil positioned to interact with a permanent magnet (not shown) fixed to the drive base plate (also not shown) for controlling movement of the arm 2104. The actuator arm 2104 laterally extends from the side of the hub 2109 to cantilever the optical head, including the slider 2120 and objective lens 1710, over the surface of the optical medium. The actuator arm 2104 provides a coarse positioning mechanism for moving the optical head to a desired point on the optical medium.

The system 2100 may include an optics module 2110 mounted on a portion of the actuator arm 2104. The optics module 2110 may include a light source 210, a collimator lens 2112, an anamorphic prism 2114, a front facet monitor 2116, a polarization rotator 2118, and a data and servo detector 2010. A light beam generated by the light source 210 is collimated by the collimator lens 2112 and the anamorphic prism 2114. The beam is guided by a galvo mirror 2020 in a galvo mirror assembly and a folding mirror 2030 to the objective lens 1710. The beam then passes through the relay lens 1704 and imaging lens 1708. The galvo mirror 2020 is controlled to provide a fine positioning mechanism for precisely positioning the read/write beam on a desired point on the optical medium.

All the optical elements in the optical train, including the optics module 2110, the relay lens 1704, the galvo mirror 2020, the imaging lens 1708, and the folding mirror 2030 are secured to the rotary actuator arm 2104 and have a fixed spatial relation with one another. Thus, the above optical elements form a fixed optics module. The remainder of the optical train is the flying head which includes the objective lens 1710 which is part of a slider 2120 and is positioned to float over the surface 1712 via a resilient flexure 2130. As described previously, the slider 2120 has a SIL or a GRIN lens located between the objective lens 1710 and the optical medium.

Therefore, the elements in the optical train have a predetermined spatial relationship with one another regardless of the position of the actuator arm 2104. As the arm 2104 rotates, all the optical elements of the optical train rotate accordingly. The coarse positioning of the flying head relative to the optical medium is done by rotating the actuator arm 2104; fine beam tracking is done by adjusting the beam with the galvo mirror 2020.

Figure 4A:
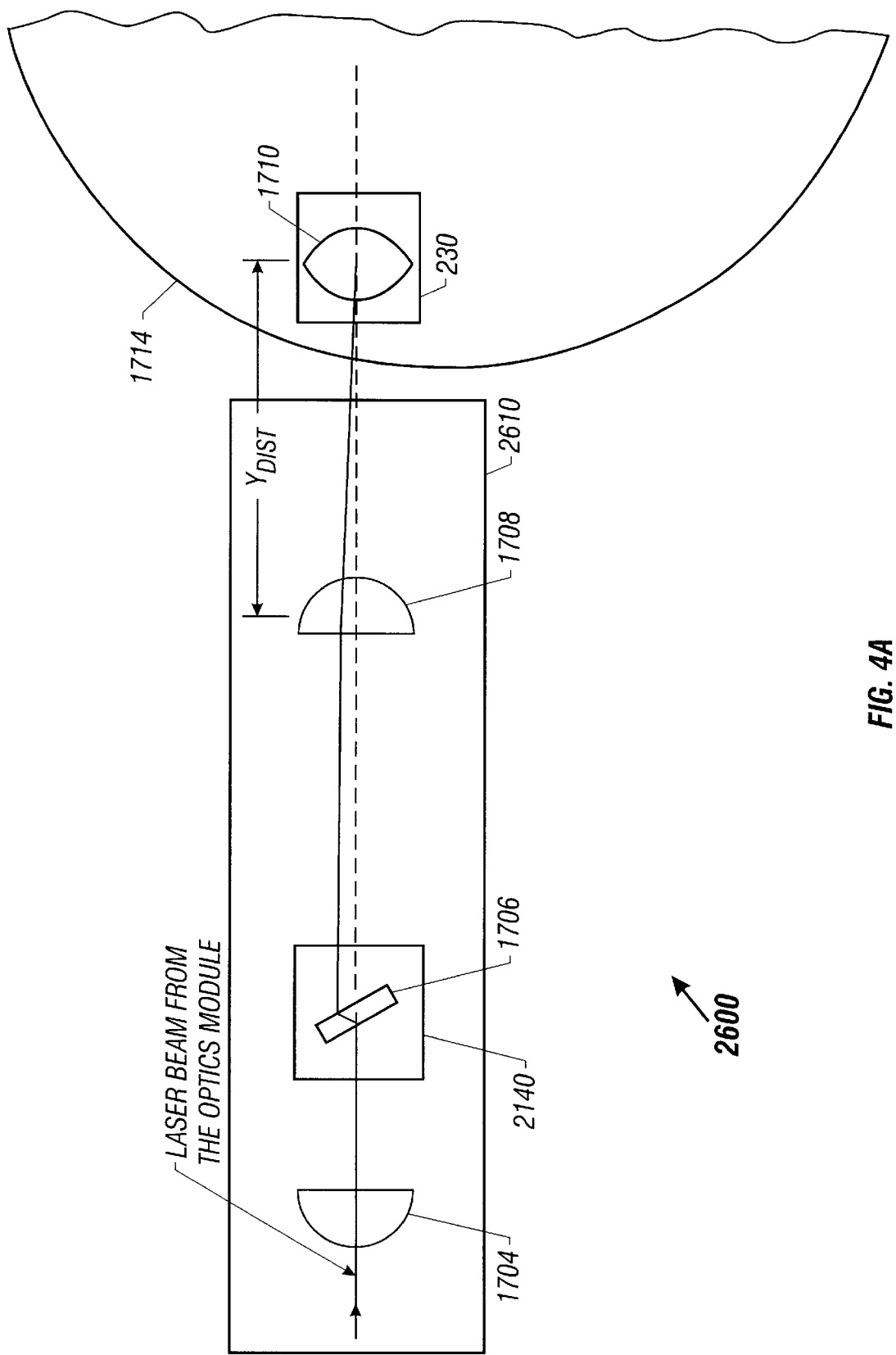
FIGS. 4A, 4B, 4C, and 4D illustrate a linear actuator and graphs showing the operation thereof for an optical disk drive according to an embodiment of the invention.
Figure 4B:
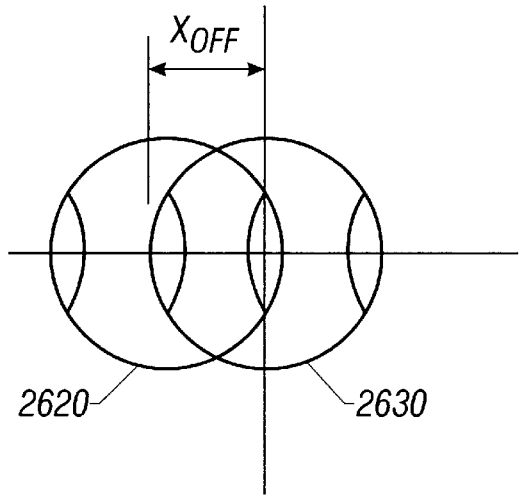
Figure 4C:
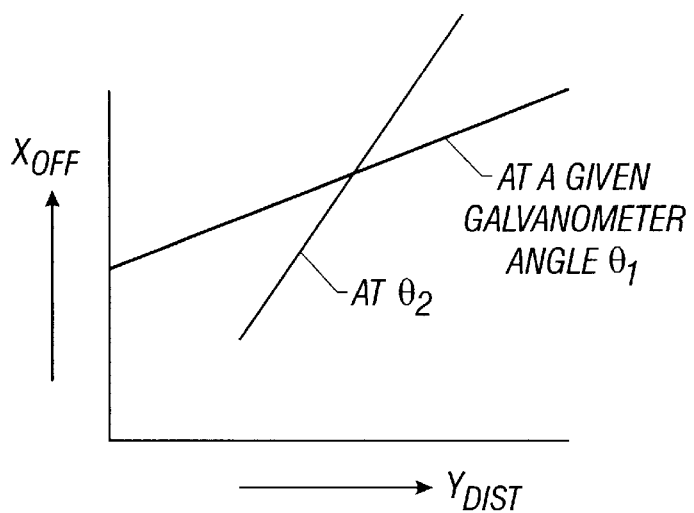

FIGS. 4A to 4C shows a linear actuator system 2600. The optics module 1702 having the light source and detection module is not shown in FIG. 4A. In this embodiment, a distance $Y_{DIST}$ between the objective lens 1710 and the imaging lens 1708 is adjustable by the linear actuator 2610 rather than by being fixed in the system as with a rotary actuator.

In operation, the linear actuator 2610 moves the flying head 230 along the optical axis of the optical train to coarsely position the objective lens 1710 over a recording surface of the disk 1714. A change in the distance $Y_{DIST}$ can result in a displacement of the beam on the objective lens and thereby on the disk surface. This displacement further causes a shift in the position of the reflected beam ("beam walk-off") on the servo detector in the optics module. The beam walk-off detected by the servo detector can be used to maintain proper tracking of the beam on the disk.

An offset $X_{OFF}$ between an ideal lobe 2630 and an actual lobe 2620 observed by the servo detector in the optics module varies linearly with the position of the flying head 230 on the disk surface 1714 and linearly with the angle/position of the transparent plate 1706 if the offset is uncompensated. By knowing the disk radius where the flying head 230 is positioned and the position of the galvanometer 2140 (e.g., the angle θ as provided by a bi-cell detector), a tracking servo control loop may be used to compensate for the offset $X_{OFF}$ for all disk radii and beam angles (i.e., for all values of the angle θ).

Figure 4D:
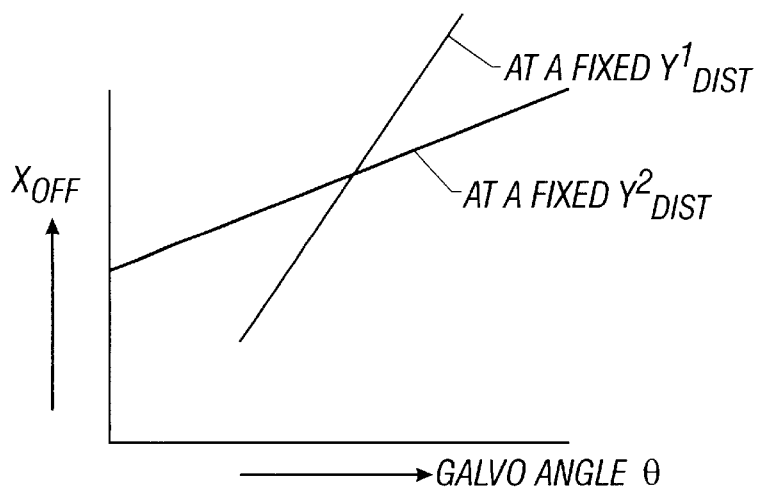

FIG. 4B illustrates the beam offset $X_{OFF}$ that is seen on the servo detector. The reflected beam from the flying head produces a well-aligned beam spot 2630 on the servo detector if the optical train is optimally aligned. Otherwise, the reflected beam will produce a beam spot 2620 that is offset from the ideal position 2630. This offset can be compensated by, for example, either adjusting the distance $Y_{DIST}$ for a fixed position of the galvanometer as shown in FIG. 4C, or adjusting the tilted angle of the galvanometer for a fixed distance as $Y_{DIST}$ as shown in FIG. 4D.

The optical medium used in the present invention is usually an magneto-optic material in the form of a disk. Data is imprinted on such a magneto-optic disk over areas called "lands" between tracking grooves that are arranged in an arcuate configuration such as spiral grooves or concentric grooves. During a readout, a segment of a data track can modulate the phase and intensity distribution of a read/write beam reflected from the optical disk. This modulation effectively superimposes the data onto the beam. Conversely, during a writing process, the write beam is modulated to alter the magnetic states of the recording medium to record data.

The tracking grooves produce certain tracking patterns associated with the relative positioning of a read/write beam with respect to two adjacent tacking grooves in the reflected beam. The data detector senses the reflected beam to generate a tracking error signal ("TES") which is used to maintain the beam on a desired track and to extract the data during a readout from the read/write beam. One scheme to produce the TES signal is by interfering the diffracted beams with the zero-order reflected beam from a grating formed by the tracking grooves to generate the tracking patterns. For example, the (±1) diffracted beams within the aperture of the near-field lens can interfere with the zero-order reflected beam to form two tracking patterns.

A TES signal may be detected by using a split detector scheme. FIG. 5A shows enlarged segments of two adjacent tracks 501 and 502 on the optical disk. Dashed line 504 parallel to the tracks represents the desired center track of the read/write beam which is parallel to the tracks in the medium. A beam projects a spot 503 on the disk. FIG. 5B shows a split detector 500 has a first sensor 510 and a second sensor 520 that are split along a direction in the image of two adjacent tracks 501 and 502 in the reflected read beam 530 that is parallel to the tracks. Features 531 and 532 indicate the track patterns on the reflected beam which can be formed by the interference patterns of the zero-order diffraction beam and the (±1) order diffraction beams.

The TES signal is the difference between the output signals of sensors 510 and 520. If the read beam is right at the center of the two tracks, the tracking signals from the sensors 510 and 520 are identical and the TES signal is zero. If the beam is positioned off the center line between two adjacent tracks, a non-zero TES signal is generated since the two sensors 510 and 520 sense a different amount of track features. The sign and magnitude of the TES signal indicate the direction and amount of offset from the track. The control system then adjusts the read beam back to the desired track by reducing or minimizing the TES signal.

For convenience, the TES signal may be divided by the total signal detected by the split detector to obtain a normalized TES signal ("NTES"). The sign and magnitude of the NTES signal are thus used for tracking operations. One advantage of using NTES instead of TES is that the variation in the beam power is automatically compensated so that the magnitude of the NTES can be used to determine the amount of beam offset for different power levels of the read/write beam.

Alternatively, a split detector may include four separate sensors that are arranged in a symmetric configuration with two sensors to sense one side of the desired track and the other two sensors to sense another side.

The NTES signal is in general a sine-like signal which oscillates with a period corresponding to the spatial period of the tracking grooves (i.e., groove pitch). The averaged DC value of the NTES is used to indicate whether or not a read/write beam deviates from a desired track. In a practical implementation, beam tracking may be considered satisfactory if the averaged DC value of the NTES is within a certain tolerance range.

The objective lens and the near-field lens may cause optical aberrations on the wavefront of a read/write beam. The interference between the aberrations and the track error signals can distort the phase in the wavefront of the reflected beam. As described below, such phase distortions are in general dependent on the polarization of the input optical beam to the optical medium with respect to the tracking grooves.

It is also recognized that the near-field interaction between the flying head and the medium can introduce an additional phase distortion in the reflected beam. Therefore, even if the medium is a plain reflector without the tracking grooves, phase distortion in the wavefront of the reflected beam still exists.

Furthermore, the polarization of a polarized beam can be changed by the focusing of the objective lens and the near-field lens. A linearly polarized beam incident to the flying head thus may have both p-polarized and s-polarized components at the medium which experience different phase delays. Such focusing-induced different phase delays on the different components of the same optical wave can also cause phase distortion.

Since the track signals are imprinted on the wavefront of the reflected wave as phase information, the phase distortion and the useful phase information for data and tracking can interfere with each other to cause a significant reduction in the TES signal. This interference not only can adversely affect the tracking of the system but also can degrade the signal to noise ratio in extraction of the data.

FIG. 6A and FIG. 6B Show two different test systems using a flying head 610 with a SIL 612 as the near-field lens. The flying head 610 has an objective lens 614. A slider 616 is used to integrate the objective lens and the SIL 612 in a desired configuration. A medium 620 has a reflective top surface without tracks is positioned in a near-field configuration with respect to the flying head 610. A linear polarizer 630 is used to control the polarization of an input beam 640 in a designated x direction.

Figure 7A:
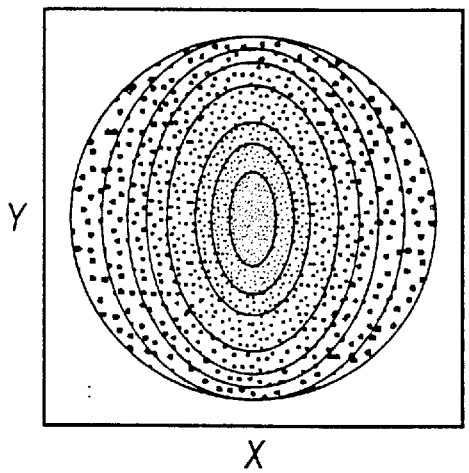
FIGS. 7A, 7B, 8A, and 8B are simulated intensity and phase profiles showing the phase distortion of a near-field flying head SIL system.
Figure 7B:
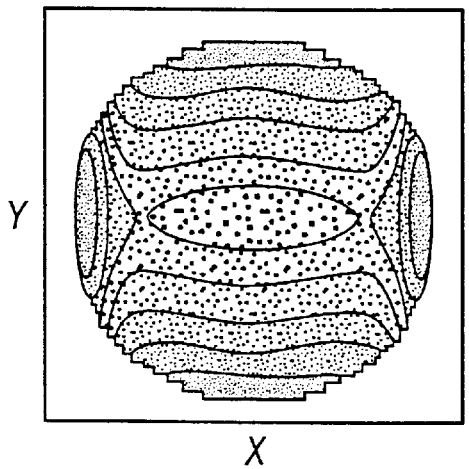

In the first test system of FIG. 6A, the reflected beam 642 nearly retraces the path of the input beam 640 and passes the polarizer 630 before entering a split detector 660. FIG. 7A shows a simulated intensity pattern of the reflected beam 642 at the detector 660. FIG. 7B shows a simulated phase distribution of the reflected beam 642 which has a phase aberration profile along the polarization direction (i.e., the x-direction) of the input beam 640. This phase profile is contributed by both the lens aberrations from the objective lens 614 and the SIL 612 and the extra phase distortion from the near-field effect. The inventor discovered that the orientation of the phase aberration profile changes with polarization of the input beam 640. In addition, the phase aberration profile is substantially symmetric about the center of the beam.

Figure 8A:
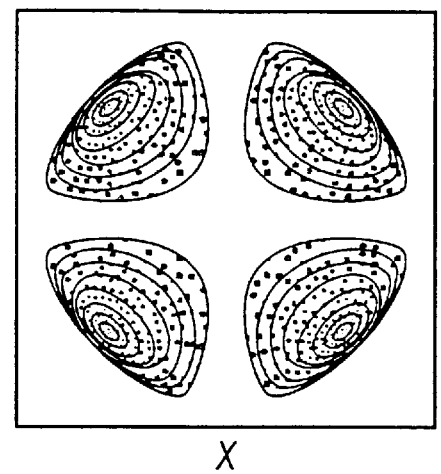
Figure 8B:
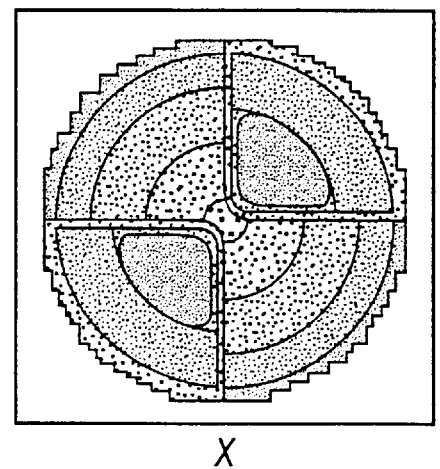

In the second test system as in FIG. 6B, a beam splitter 650 is inserted between the polarizer 630 and the flying head 610 to direct the reflected beam to another linear polarizer 631. The polarization of the polarizer 631 is set perpendicular to the direction of the polarizer 630. FIGS. 8A and 8B respectively show the simulated intensity pattern and phase distribution of the beam 643 detected at a position after the polarizer 631. Note that the second polarizer 631 significantly reduces the magnitude of the output beam 643. This further confirms that the polarization of the phase-distorted reflected signal is substantially parallel to the polarization of the input beam 640.

One way to reduce the effect of this phase distortion is to separate the data-bearing phase information from the phase distortion. This can be accomplished, based on the discovery of the polarization dependence of the phase distortion, by setting the polarization of the input optical beam perpendicular to the direction of the tracks in the magneto-optic medium. In this configuration, the data-bearing phase information in the reflected beam has a spatial profile along the direction of the tracks while the polarization-dependent phase distortion has a spatial profile orientated perpendicular to the direction of the tracks.

To separate the phase distortion from the reflected signal, the split detector is preferably aligned in a way such that the division line of the two sensors of the split detector is along a direction in the wavefront of the reflected beam that is equivalent to the direction of the tracks in the medium. Since the phase distortion profile is symmetric, the two sensors in the split detector sense essentially two identical portions of the phase distortion signal. Therefore, by subtracting the detected signals from both sensors in generating the TES signal, the contribution from the phase distortion is substantially canceled.

Figure 9A:
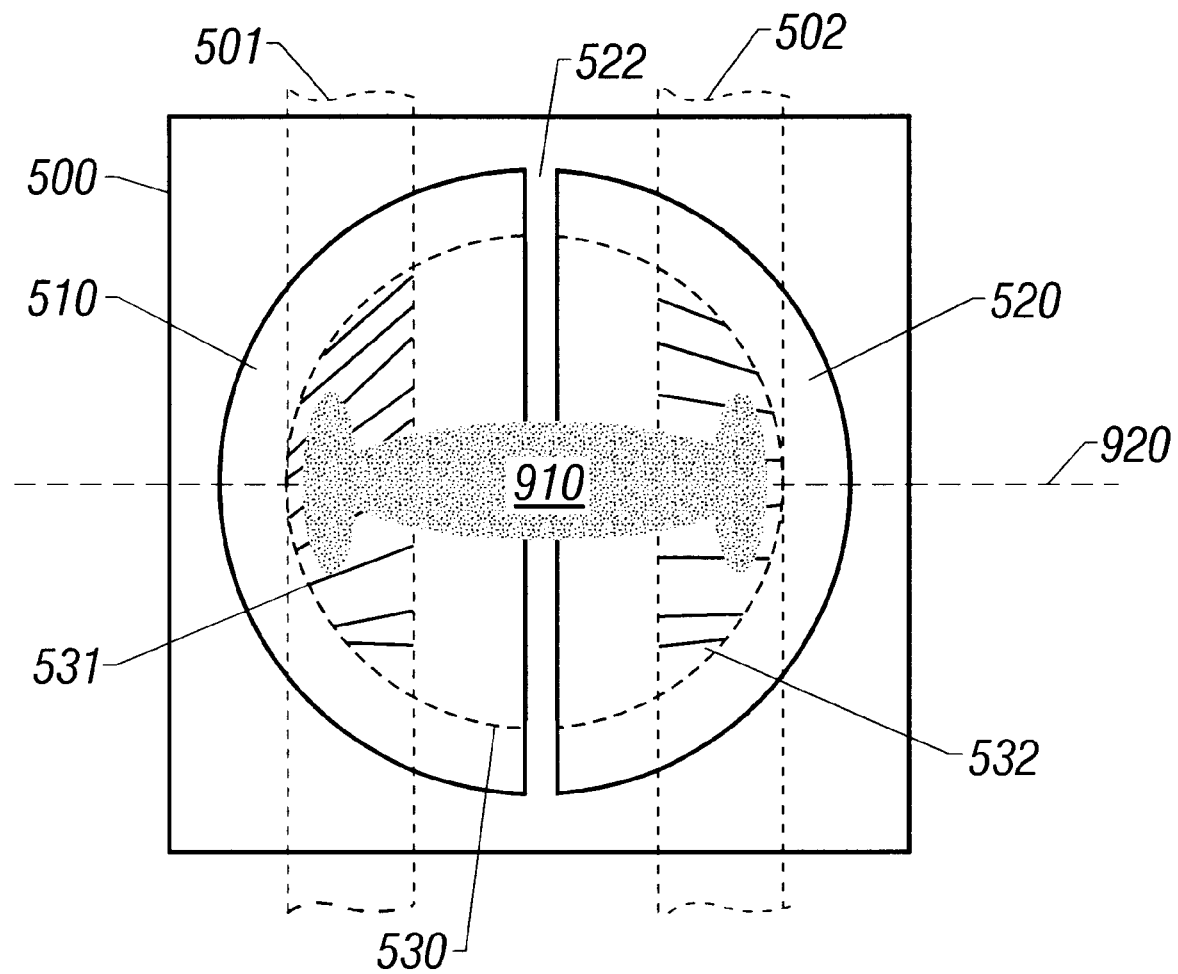
FIG. 9A is a diagram illustrating the effect of polarization rotation on the phase distortion that is detected by a split detector.

FIG. 9A illustrates the relative positioning and orientation of the phase distortion profile 910 relative to the input polarization direction 920 and the tracks 501 and 502 in the plane of the receiving split detector 500 when the polarization of the input beam is perpendicular to the tracks. The data-bearing phase profile is not shown for simplicity.

Figure 9B:
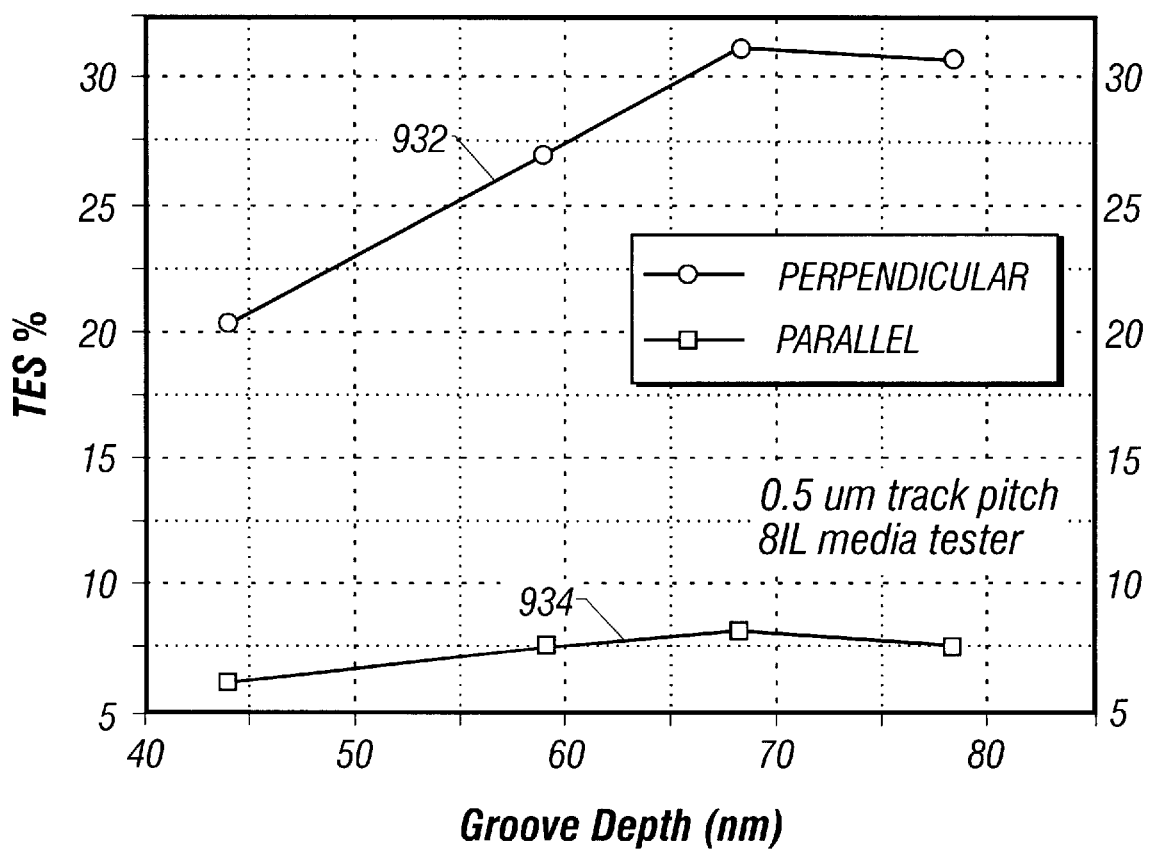
FIG. 9B is a chart showing measured tracking error signals with and without polarization rotation in a near-field SIL system.

FIG. 9B further shows test results on a magneto-disk with 0.5 μm-wide tracks and a SIL flying head of 70% transmission efficiency in a near-field configuration by using a media tester. The upper trace 932 represents measured TES signal when the input polarization is perpendicular to the tracks and the lower trace 934 represents measured TES signal when the input polarization is parallel to the tracks. Approximately, a more than three-fold gain in the TES signal is observed by eliminating the interference caused by the phase distortion based on the above technique.

In a near-field optical storage system based on a linear actuator, such as the embodiment shown in FIG. 4A, the relative orientation of the flying head and the tracks on the disk remains unchanged.

One implementation of the above technique can be accomplished by deploying a phase retardation device in the path of the input beam. This phase retardation device rotates the polarization of the input beam to a direction perpendicular to the tracks in the optical disk.

Figure 10:
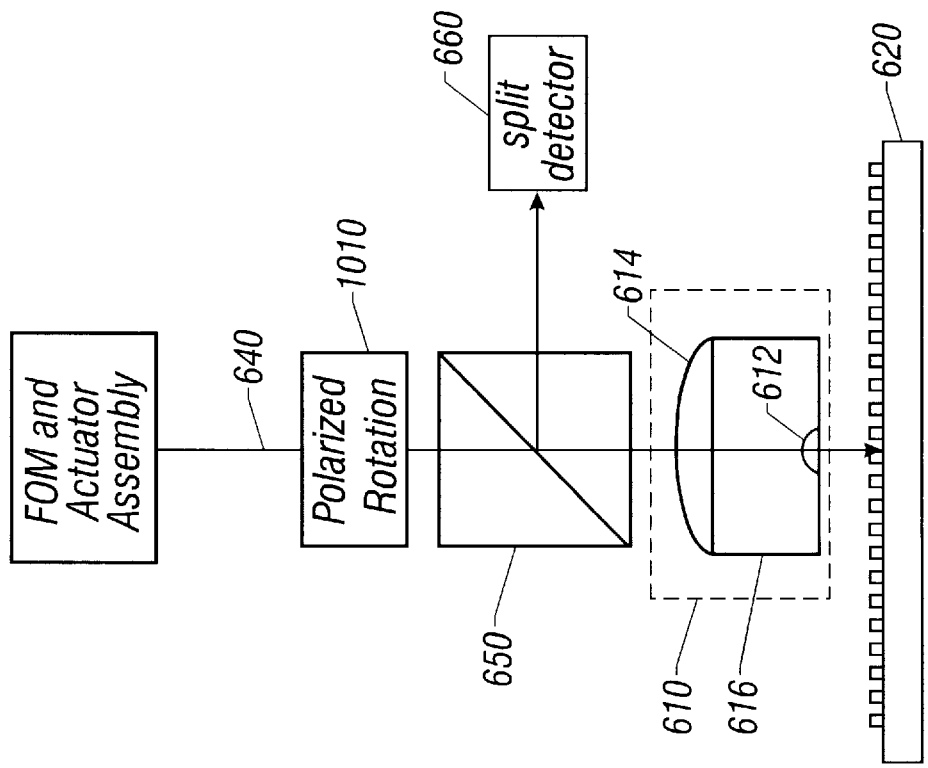
FIG. 10 is a schematic diagram showing a near-field flying head system with a polarization rotator for minimizing effect of phase distortion.

FIG. 10 shows a near-field optical storage system with a polarization compensating rotator 1010. The polarization rotator 1010 may be any optical device capable of changing the polarization of a beam. A birefringent plate with a desired retardation phase (e.g., a λ/2 plate) or a liquid crystal device are examples of such devices.

If the actuator is a rotary actuator, such as the system shown in FIG. 3, the relative orientation of the flying head or the actuator arm with respect to the tracks in the disk changes within a rotational angle range. Thus, the polarization of the beam perpendicular to the tracks at one actuator position will no longer be perpendicular to the tracks at a different actuator position due to the rotational motion of the rotary actuator. In order to maintain the beam polarization perpendicular to the tracks at all actuator locations, a rotation mechanism may be implemented to dynamically adjust the orientation of the polarization rotator 1010 according to the position change of the rotary actuator.

A simpler way to implement the above polarization rotation mechanism for separating the phase distortion from the useful signal is to fix the beam polarization at a predetermined orientation with respect to the rotary actuator. Assume, at one end of the rotational angle range, the beam polarization is at a first direction in order to be perpendicular to the tracks, and the beam polarization is at a second direction at another end of the rotational angle range to be perpendicular to the tracks. The polarization rotator 1010 can be set to rotate the beam polarization at a fixed direction half way between the first and second directions. For example, if the relative angle of the beam polarization with respect to the normal direction of the tracks varies from −3 degrees to 17 degrees within the rotational range of the rotary actuator, the input polarization should be fixed with respect to the actuator so that the polarization is perpendicular to the tracks at about the 7-degree position, i.e., about 10 degrees off the normal direction to the tracks. In the above configuration, the average effect of the phase distortion caused by the lens aberrations and the near-field effect is significantly reduced within the angular rotation range of the actuator.

However implemented, the position of the polarization rotator 1010 may be anywhere in the optical train between the light source and the flying head 610. For example, the polarization rotator 1010 may be part of the fixed optics module.

Rotating the input polarization can facilitate separation of the phase distortion signal from the data-bearing signal. However, the phase distortion signal still exits. A phase compensating mechanism may be implemented in the optical path of the read/write beam to substantially reduce or eliminate the phase distortion from the reflected beam. According to this aspect of the invention, a phase compensating element can be configured to have a phase distribution complementary to the phase distortion and to cancel out the phase distortion.

For a given near-field optical storage system, the total lens aberrations of the objective lens and the near-field lens and the focusing-induced phase distortion can be determined, for example, by measurements. The phase distortion of the near-field effect can also be determined. Thus, the total phase distortion of the system can be determined. A phase compensation element, therefore, can be designed to have a phase profile that cancels out this known phase distortion. For example, an aspherical lens with a suitable geometrical configuration or a holographic lens or film may be used for this purpose. Techniques of making optical phase modulation elements to have known phase profiles are well known in the art.

Figure 11:
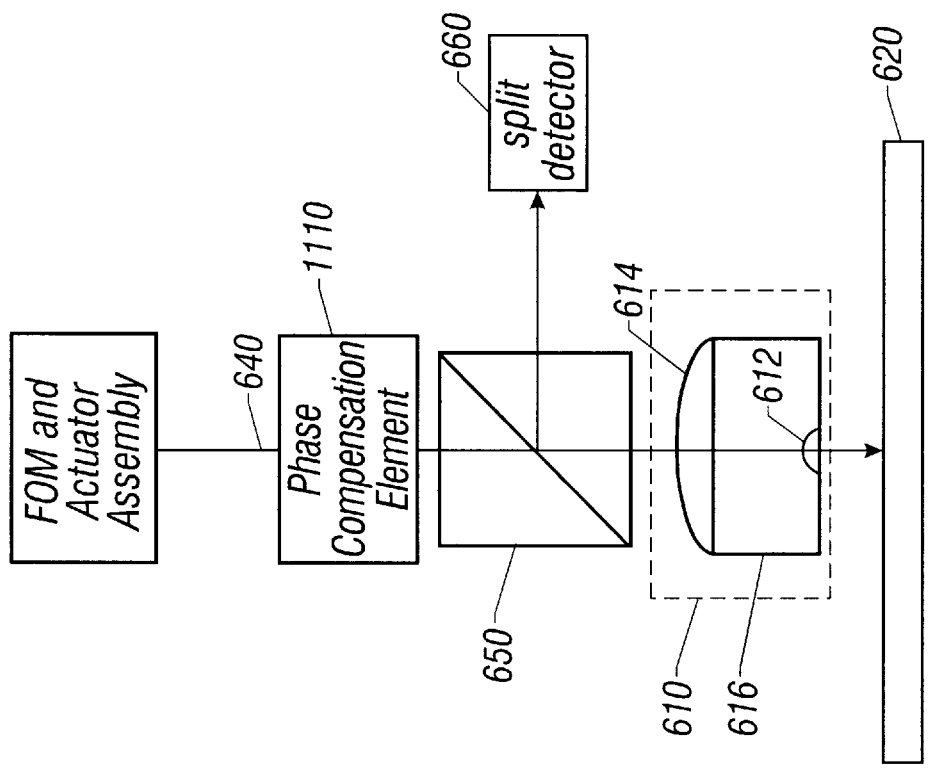
FIG. 11 is a schematic diagram showing a near-field flying head system with a phase compensating element for reducing the effect of phase distortion.

FIG. 11 shows a system having such a phase compensating element 1110. In general, the phase compensating element may be placed anywhere in the optical path between the light source and the split detector 660. In particular, the desired phase compensating profile may be embedded in one or more optical elements in the optical train so that a separate phase compensating element is no longer needed. For example, the phase compensating profile may be built in the objective lens 614 or the slider 616 in the flying head 610.

In this embodiment, the polarization of the input beam is not necessarily to be perpendicular to the tracks. However, both polarization rotator and phase compensating element may be used in combination to reduce the effect of the phase distortion.

Furthermore, two or more phase compensating elements may be used. Each phase compensating element may have a unique phase compensating profile designed for correcting phase distortion at a selected position in the optical path. In case of two phase compensating elements, for example, one may be placed before the flying head 610 and another may be in the path of the reflected beam after the beam splitter 650.

However implemented, the phase compensating profile is in general a function of the position in a plane perpendicular to the propagation direction of the beam. The phase delay profile of an aspherical lens is such an example. Another example is a phase profile for compensating the phase distortion caused by the focusing-induced polarization change. Focusing produced by the objective lens and the near-field lens in the flying head bends the rays of a beam and changes the polarization direction with respect to the plane formed by the initial polarization and the initial propagation direction of the write/read beam. The change in the direction of the polarization varies with the location at which a light ray hits the objective/near-field lens assembly. Thus a phase compensating profile for this particular phase distortion is also dependent on the location.

A dynamically adjustable phase compensating element may also be used in place of a phase compensating element with a fixed phase profile. Such an adjustable phase compensating element can compensate for phase distortion variations present in the reflected optical beam due to factors such as variations in the operating conditions or can be adjusted to adapt to different optical media.

For example, a liquid crystal light valve can be electrically controlled to produce variable phase profiles. Typical liquid crystal light valves have an array of liquid crystal pixels. Each pixel can be electrically or optically addressed and controlled independently by a control circuit. This is well known in the art. Such a liquid crystal light valve can be programmed to generate a desired phase compensation profile. A set of predetermined phase compensation profiles may be stored in the control circuit (e.g., a computer) and a stored phase profile can be fetched to control the liquid crystal light valve as needed. In particular, a liquid crystal light valve may be used to automatically perform phase compensation according to a control sequence or computer program.

It is further contemplated that a liquid crystal light valve can also used to rotate the polarization of a beam in a near-field optical storage system. Hence, the polarization rotator 1010 of FIG. 10 may be a liquid crystal light valve. A liquid light valve may also be configured to function as both a phase compensating element and a polarization rotator and deployed in the optical train at a position between the light source and the flying head.

Although the present invention has been described in detail with reference to the preferred embodiments, various modifications and enhancements may be made without departing from the spirit and scope of the following claims.

What is claimed is:

1. An optical system, comprising:
   an objective lens;
   a near-field lens disposed relative to said objective lens at a prespecified position to receive an optical beam of a selected wavelength from said objective lens;
   an optical medium disposed on the opposite side of said near-field lens from said objective lens at a distance smaller than said selected wavelength to form a near-field configuration; and
   an optical phase-compensating element, disposed in an optical path that includes said objective lens, near-field lens and an optical medium and configured to have a phase profile to substantially reduce a phase distortion.

2. A system as in claim 1, wherein said optical phase-compensating element includes an optical element having a predetermined aspheric surface profile.

3. A system as in claim 1, wherein said optical phase-compensating element includes a holographic element.

4. A system as in claim 1, wherein said optical phase-compensating element includes a liquid crystal element.

5. A system as in claim 1, wherein said optical phase-compensating element is located relative to said objective lens at the opposite side of said near-field lens from said optical medium and has a polarization-rotating mechanism to rotate the polarization of said optical beam.

6. A system as in claim 1, wherein said phase profile in said optical phase-compensating element further comprises phase information to substantially reduce a phase distortion caused by a focusing action on said optical beam by said objective lens and near-field lens.

7. A system as in claim 1, wherein said phase profile in said optical phase-compensating element further comprises phase information to substantially reduce a phase distortion caused by optical aberrations.

8. A system as in claim 1, wherein said phase profile in said optical phase-compensating element further comprises phase information to substantially reduce a phase distortion caused by said near-field configuration.

9. A system as in claim 1, wherein said phase-compensating element has an adjustable phase profile.

10. An optical system, comprising:
    an optical module including an objective lens and a near-field lens disposed relative to said objective lens at a prespecified position;
    an optical medium configured to have substantially arcuate tracks and disposed relative to said near-field lens at a distance smaller than a desired electromagnetic wavelength to form a near-field configuration, said optical medium and said objective lens being on the opposite sides of said near-field lens; and
    an optical polarization rotator, located relative to said optical module and configured to rotate a polarization of said optical beam to a direction substantially perpendicular to said tracks, thereby facilitating a separation of a polarization-dependent phase distortion signal from a signal in a reflection of said optical beam from said optical medium.

11. A system as in claim 10, wherein said optical polarization rotator includes a half-wave plate.

12. A system as in claim 10, wherein said optical polarization rotator includes a liquid crystal element.

13. A system as in claim 10, wherein said optical polarization rotator is located on the opposite side of said objective lens from said near-field lens and further comprising a beam splitter disposed between said optical polarization rotator and said objective lens to guide a reflected beam of said optical beam from said optical medium to a detector.

14. An optical system, comprising:
    an optical module having an objective lens and a near-field lens disposed relative to said objective lens at a prespecified position, said optical module adding a phase distortion to an optical beam passing therethrough;
    an optical medium disposed on the opposite of said near-field lens from said objective lens at a distance so that optical energy is coupled between said optical medium and said near-field lens by evanescent fields; and
    means for imposing a phase profile on said optical beam to substantially reduce said phase distortion.

15. A system as in claim 14, wherein said means for imposing said phase profile includes a phase-compensating element disposed in the optical path of said optical system.

16. A system as in claim 14, wherein said means for imposing said phase profile is a phase variation on said optical beam caused by said objective lens.

17. A system as in claim 14, wherein said means for imposing said phase profile is a phase variation on said optical beam caused by said near-field lens.

18. A system as in claim 14, wherein said phase profile comprises phase information to substantially reduce a phase distortion caused by a focusing action on said optical beam by said objective lens and near-field lens.

19. A system as in claim 14, wherein said phase profile comprises phase information to substantially reduce a phase distortion caused by optical aberrations.

20. A system as in claim 14, wherein said phase profile comprises phase information to substantially reduce a phase distortion caused by said energy coupling between said optical medium and said near-field lens by evanescent fields.

21. An optical system in a near-field configuration, comprising:
    a light-producing module operable to produce an optical beam of a selected wavelength;

an optical head comprising an objective lens located to receive and modify said optical beam and a near-field lens disposed relative to said objective lens at a prespecified position to receive said optical beam from said objective lens;

an imaging module disposed relative to said light-producing module and said optical head to direct said optical beam to said optical head;

an optical data storage disk disposed relative to said near-field lens at a distance smaller than said selected wavelength to form a near-field configuration and operable to spin to support said optical head by an air-bearing layer; and means for imposing a compensating phase profile on said optical beam to substantially reduce a phase distortion.

22. A system as in claim 21, wherein said means includes an optical element in the optical path of said system which has a predetermined aspheric surface based on said compensating phase profile.

23. A system as in claim 21, wherein said means includes a holographic element disposed in the optical path of said system.

24. A system as in claim 21, wherein said means includes a liquid crystal element disposed in the optical path of said system.

25. A system as in claim 21, wherein said means is an optical phase-compensating element located relative to said objective lens at the opposite side of said near-field lens from said optical medium, wherein said optical phase-compensating element has a polarization-rotating mechanism to rotate the polarization of said optical beam.

26. A system as in claim 21, wherein said compensating phase profile comprises phase information to substantially reduce a phase distortion caused by focusing of said optical beam.

27. A system as in claim 21, wherein said compensating phase profile comprises phase information to substantially reduce a phase distortion caused by optical aberrations.

28. A system as in claim 21, wherein said compensating phase profile comprises phase information to substantially reduce a phase distortion caused by said near-field configuration.

29. A system as in claim 21, wherein said optical disk is configured to have tracking grooves and further comprising a polarization rotator located between said light-producing module and said optical head and operable to rotate a polarization of said optical beam to be substantially perpendicular to said tracking grooves.

30. An optical system, comprising:

a light-producing module operable to produce an optical beam of a selected wavelength;

an optical head comprising an objective lens located to receive and modify said optical beam and a near-field lens disposed relative to said objective lens at a prespecified position to receive said optical beam from said objective lens;

an imaging module disposed relative to said light-producing module and said optical head to direct said optical beam to said optical head;

an optical data storage disk configured to have tracking grooves and disposed relative to said near-field lens so that optical energy is coupled between said optical disk and said near-field lens by evanescent fields, wherein said optical disk is operable to spin to support said optical head by an air-bearing layer; and a polarization rotator located between said light-producing module and said optical head and operable to rotate a polarization of said optical beam to be substantially perpendicular to said tracking grooves.

31. A system as in claim 30, further comprising a photodetector disposed to receive a reflected beam of said optical beam from said optical disk and configured to have two identical light-sensing areas symmetrically arranged relative to each other along a line parallel to images of said tracking grooves in said reflected beam, wherein a phase distortion caused by said evanescent fields and lens aberrations of said objective lens and said near-field lens is substantially reduced in a difference between signals from said two sensing areas.

32. A method for constructing and operating an optical storage system, comprising:

providing an optical system including an objective lens and a near-field lens to receive and modify an electromagnetic radiation wave at a desired electromagnetic wavelength;

placing a storage medium responsive to said radiation wave relative to said near-field lens at a distance smaller than said desired wavelength;

determining a phase distortion that includes at least contributions from lens aberrations from said optical system and from a near-field effect produced by said near-field lens and said optical storage medium; and compensating for said phase distortion by using an optical phase-compensating element in the optical path of said optical system wherein said optical phase-compensating element is configured to have a compensating phase profile complementary to said total phase distortion.

33. A method for constructing and operating an optical storage system, comprising:

providing an objective lens to receive and modify an optical beam of a selected wavelength;

disposing a near-field lens relative to said objective lens at a prespecified position to receive said optical beam from said objective lens;

placing an optical storage disk with tracking grooves relative to said near-field lens at a distance smaller than said selected wavelength;

rotating a polarization of said optical beam to a direction that is substantially perpendicular to said tracking grooves; and separating a phase distortion signal from a signal produced by reflection of said optical beam from said optical disk.

34. A method as in claim 33, wherein separating a phase distortion signal from said signal is performed by detecting said reflection by using a photodetector configured to have two identical light-sensing areas symmetrically arranged relative to each other along a line parallel to images of said tracking grooves in said reflection, wherein a phase distortion caused by said evanescent fields and lens aberrations of said objective lens and said near-field lens is substantially reduced in a difference between signals from said two sensing areas.

35. An optical system, comprising:

a module including an objective lens and a near-field lens disposed relative to said objective lens with a prespecified spacing and operating to receive and modify an electromagnetic radiation at a desired electromagnetic wavelength;

a medium configured to have a material responsive to said radiation and substantially arcuate tracks and disposed relative to said near-field lens at a distance smaller than said desired electromagnetic wavelength to form a near-field configuration, wherein said medium and said objective lens are located on the opposite sides of said near-field lens; and means for reducing an effect of a phase distortion in said radiation to perform at least one of (1) rotating a polarization of said radiation to a direction substantially perpendicular to said tracks, thereby facilitating a separation of a polarization-dependent phase distortion signal from a signal in a reflection of said radiation from said medium; and (2) imposing a distortion-compensating phase profile on said radiation to substantially reduce said phase distortion.

36. An optical system as in claim 35, wherein said objective lens and near-field lens effect a numerical aperture greater than unity.

* * * * *